United States Patent
Han et al.

(10) Patent No.: US 11,893,107 B2
(45) Date of Patent: Feb. 6, 2024

(54) APPARATUS AND METHOD FOR PREVENTING SECURITY THREAT TO VIRTUAL MACHINE

(71) Applicant: ELECTRONICS AND TELECOMMUNICATIONS RESEARCH INSTITUTE, Daejeon (KR)

(72) Inventors: Seung-Hun Han, Daejeon (KR); Seong-Joong Kim, Daejeon (KR); Gak-Soo Lim, Daejeon (KR); Byung-Joon Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 364 days.

(21) Appl. No.: 17/489,032

(22) Filed: Sep. 29, 2021

(65) Prior Publication Data

US 2023/0016571 A1      Jan. 19, 2023

(30) Foreign Application Priority Data

Jul. 13, 2021   (KR) ........................ 10-2021-0091593

(51) Int. Cl.
*G06F 21/53*   (2013.01)
*G06F 21/54*   (2013.01)
(Continued)

(52) U.S. Cl.
CPC .......... *G06F 21/53* (2013.01); *G06F 9/45558* (2013.01); *G06F 21/54* (2013.01); *G06F 21/554* (2013.01); *G06F 2009/45587* (2013.01)

(58) Field of Classification Search
CPC ...... G06F 21/53; G06F 9/45558; G06F 21/54; G06F 21/554; G06F 2009/45587; G06F 21/55; G06F 21/604; G06F 2221/2149
See application file for complete search history.

(56) References Cited

U.S. PATENT DOCUMENTS 10,121,004 B2   11/2018   Kim et al.
10,395,029 B1 *  8/2019   Steinberg ................ G06F 21/53
(Continued)

FOREIGN PATENT DOCUMENTS

KR   10-2017-0041618 A    4/2017
KR        10-1816866 B1   1/2018
(Continued)

OTHER PUBLICATIONS

Jiangyong Shi et al., "Hardware assisted hypervisor introspection", SpringerPlus, May 2016.

*Primary Examiner* — Ali S Abyaneh
(74) *Attorney, Agent, or Firm* — LRK PATENT LAW FIRM (57) ABSTRACT

Disclosed herein are an apparatus and method for preventing a security threat to a virtual machine. The apparatus includes one or more processors and executable memory for storing at least one program executed by the one or more processors. The at least one program is configured such that a hypervisor for virtualization in a host kernel executes a virtualization instruction corresponding to the service requested by a virtual machine of a host application and such that a hypervisor for monitoring interrupts the virtualization instruction in response to a security threat event occurring in the monitoring area of the hypervisor for virtualization and controls the process and thread of the host kernel. The hypervisor for monitoring is located in an area separate from the area in which the hypervisor for virtualization is located in the host kernel.

14 Claims, 8 Drawing Sheets

(51) Int. Cl.
  *G06F 9/455*   (2018.01)
  *G06F 21/55*   (2013.01)

(56) References Cited

U.S. PATENT DOCUMENTS

| | | |
|---|---|---|
| 10,467,410 B2 | 11/2019 | Lee et al. |
| 10,534,653 B2 | 1/2020 | Hwang et al. |
| 11,687,645 B2 | 6/2023 | Chen et al. |
| 2017/0153908 A1* | 6/2017 | Han ................... G06F 21/53 |
| 2019/0012465 A1* | 1/2019 | Kim ................... G06F 9/45558 |
| 2021/0026950 A1* | 1/2021 | Ionescu ............... G06F 9/30101 |
| 2021/0049112 A1* | 2/2021 | Xiao ................... G06F 12/1416 |

FOREIGN PATENT DOCUMENTS

| | | |
|---|---|---|
| KR | 10-2018-0116971 A | 10/2018 |
| KR | 10-2020-0052957 A | 5/2020 |

* cited by examiner

APPARATUS AND METHOD FOR PREVENTING SECURITY THREAT TO VIRTUAL MACHINE

CROSS REFERENCE TO RELATED APPLICATION

This application claims the benefit of Korean Patent Application No. 10-2021-0091593, filed Jul. 13, 2021, which is hereby incorporated by reference in its entirety into this application.

BACKGROUND OF THE INVENTION

1. Technical Field

The present invention relates generally to Virtual Machine (VM) technology, and more particularly to technology for ensuring the security of a system by detecting an attack on a virtual machine and protecting the virtual machine from the attack in a cloud-computing service.

2. Description of Related Art

Virtual machine (VM) technology is technology for creating and operating multiple virtual machines by logically isolating the resources of a physical machine. VM technology plays a key role in cloud-computing technology. Cloud service providers are able to use resources of physical machines efficiently by running multiple virtual machines in a single physical machine, and are able to effectively respond to a fault in a physical machine by replicating, backing up, or migrating a virtual machine to another physical machine. A Client-Based Computing (CBC) solution for realizing logical network separation by running virtual machines in the PC of a user also actively uses the above-described advantages of VM technology.

At the core of such VM technology, a hypervisor for managing and controlling virtual machines is present. The hypervisor separates a virtual machine and a physical machine as a guest machine and a host machine, thereby isolating the guest machine from the host machine. That is, because a virtual machine, that is, a guest machine, is isolated and controlled by the hypervisor, even if a malicious user takes over the virtual machine, the damage does not easily spread to another virtual machine or a host machine. Thanks to this characteristic, cloud service providers are able to run virtual machines of different users in a single physical machine.

However, when a hypervisor or hardware emulation function for running virtual machines has a fault, it is possible to escape from the virtual machine using the fault and to adversely affect the host machine or other guest machines. Because it has to separate a guest machine from a host machine according to the characteristics thereof, the hypervisor operates with the highest privilege level attainable using software. When the fault of the hypervisor is exposed to a malicious user, it is possible to escape from the guest machine using the fault and to occupy the host machine and the guest machine. If the hardware emulation function for configuring virtual machines has a fault, the fault may result in virtual machine escape, whereby a malicious user may gain privileges to operate the hardware emulation function. From that time, when another virtual machine performs the hardware emulation function, it is possible to perform malicious behavior.

Therefore, a new form of technology capable of overcoming the limitations of the existing technology and preventing virtual machine escape is required. New technology for ensuring the security of a system by detecting and preventing virtual machine escape needs to generate a hypervisor for monitoring in order to monitor a hypervisor for virtualization, and needs to generate a sandbox for monitoring in order to detect malicious behavior performed in the hypervisor for virtualization and a host machine. Also, it is necessary to operate and monitor the hypervisor for virtualization in the sandbox for monitoring by lowering the privilege level of the hypervisor for virtualization, which is operating with a privilege level higher than needed, and instructions associated with virtualization, which are supposed to be executed by the hypervisor for virtualization, have to be executed by the hypervisor for monitoring in place of the hypervisor for virtualization. Also, the sandbox for monitoring has to monitor the hardware emulation function of a virtual machine or the behavior of the host machine. When virtual machine escape is determined based on the monitoring result, it is necessary to control the virtual machine escape.

Meanwhile, Korean Patent Application Publication No. 10-2018-0116971, titled "Hypervisor-based virtual machine isolation apparatus and method", discloses an apparatus and method for preventing a side-channel (covert-channel) attack by isolating a virtual machine from a virtualization system.

SUMMARY OF THE INVENTION

An object of the present invention is to securely protect a system from a security threat posed to a virtual machine in a cloud-computing environment.

Another object of the present invention is to protect important information of a user of a virtual machine and to securely manage system infrastructure.

In order to accomplish the above objects, an apparatus for preventing a security threat to a virtual machine according to an embodiment the present invention includes one or more processors and executable memory for storing at least one program executed by the one or more processors. The at least one program may be configured to cause a hypervisor for virtualization in a host kernel to execute a virtualization instruction corresponding to the service requested by a virtual machine of a host application, and to cause a hypervisor for monitoring to interrupt the virtualization instruction in response to a security threat event occurring in the monitoring area of the hypervisor for virtualization and to control the process and thread of the host kernel. The hypervisor for monitoring may be located in an area separate from the area in which the hypervisor for virtualization is located in the host kernel.

Here, the hypervisor for monitoring may be set to have the highest privilege level in the host kernel, and the virtual machine and the hypervisor for virtualization may be prevented from accessing the hypervisor for monitoring.

Here, the security threat event may be triggered by access to an interrupt point preset in the monitoring area.

Here, the interrupt point may be set in the monitoring area by at least one of setting a page table privilege, setting a breakpoint, and setting monitoring of a register for CPU virtualization.

Here, when the security threat event that causes a memory area to be altered occurs in the monitoring area, the at least one program may control the process and the thread depending on a result of a determination as to whether the altered memory area is an invariable area.

Here, when the security threat event that causes a new process and thread to be created occurs in the monitoring area, the at least one program may control the process and the thread depending on a result of a determination as to whether the service requested by the virtual machine is related to the new process and thread.

Here, depending on whether information that is the same as information about a process and thread corresponding to the service requested by the virtual machine is present in the hypervisor for monitoring, the at least one program may control the corresponding process and thread.

Here, when the information that is the same as the information about the process and thread corresponding to the service requested by the virtual machine is present in the hypervisor for monitoring, the at least one program may control the process and the thread depending on whether Operating System (OS) privileges of the process and thread are valid.

Here, when the OS privileges are not valid, the at least one program may determine that the levels of the OS privileges of the process and thread are elevated, and may control the process and the thread depending on whether elevation of the levels of the OS privileges is related to the service.

Also, in order to accomplish the above objects, a method for preventing a security threat to a virtual machine, performed by an apparatus for preventing a security threat to a virtual machine, according to an embodiment of the present invention includes executing, by a hypervisor for virtualization in a host kernel, a virtualization instruction corresponding to the service requested by a virtual machine of a host application; and interrupting, by a hypervisor for monitoring, the virtualization instruction in response to a security threat event occurring in the monitoring area of the hypervisor for virtualization, and controlling, by the hypervisor for monitoring, the process and thread of the host kernel. The hypervisor for monitoring may be located in an area separate from the area in which the hypervisor for virtualization is located in the host kernel.

Here, the hypervisor for monitoring may be set to have the highest privilege level in the host kernel, and the virtual machine and the hypervisor for virtualization may be prevented from accessing the hypervisor for monitoring.

Here, the security threat event may be triggered by access to an interrupt point that is preset in the monitoring area.

Here, the interrupt point may be set in the monitoring area by at least one of setting a page table privilege, setting a breakpoint, and setting monitoring of a register for CPU virtualization.

Here, controlling the process and the thread may be configured to control the process and the thread depending on a result of a determination as to whether a memory area is an invariable area when the security threat event that causes the memory area to be altered occurs in the monitoring area.

Here, controlling the process and the thread may be configured to control the process and thread depending on a result of a determination as to whether the service requested by the virtual machine is related to a new process and thread when the security threat event that causes the new process and thread to be created occurs in the monitoring area.

Here, controlling the process and the thread may be configured to control the corresponding process and thread depending on whether information that is the same as information about the process and thread corresponding to the service requested by the virtual machine is present in the hypervisor for monitoring.

Here, controlling the process and the thread may be configured to control the process and the thread depending on whether Operating System (OS) privileges of the process and thread are valid when the information that is the same as the information about the process and thread corresponding to the service requested by the virtual machine is present in the hypervisor for monitoring.

Here, controlling the process and the thread may be configured to determine that the levels of the OS privileges of the process and thread are elevated when the OS privileges are not valid, and to control the process and the thread depending on whether elevation of the levels of the OS privileges is related to the service.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

Figure 1:
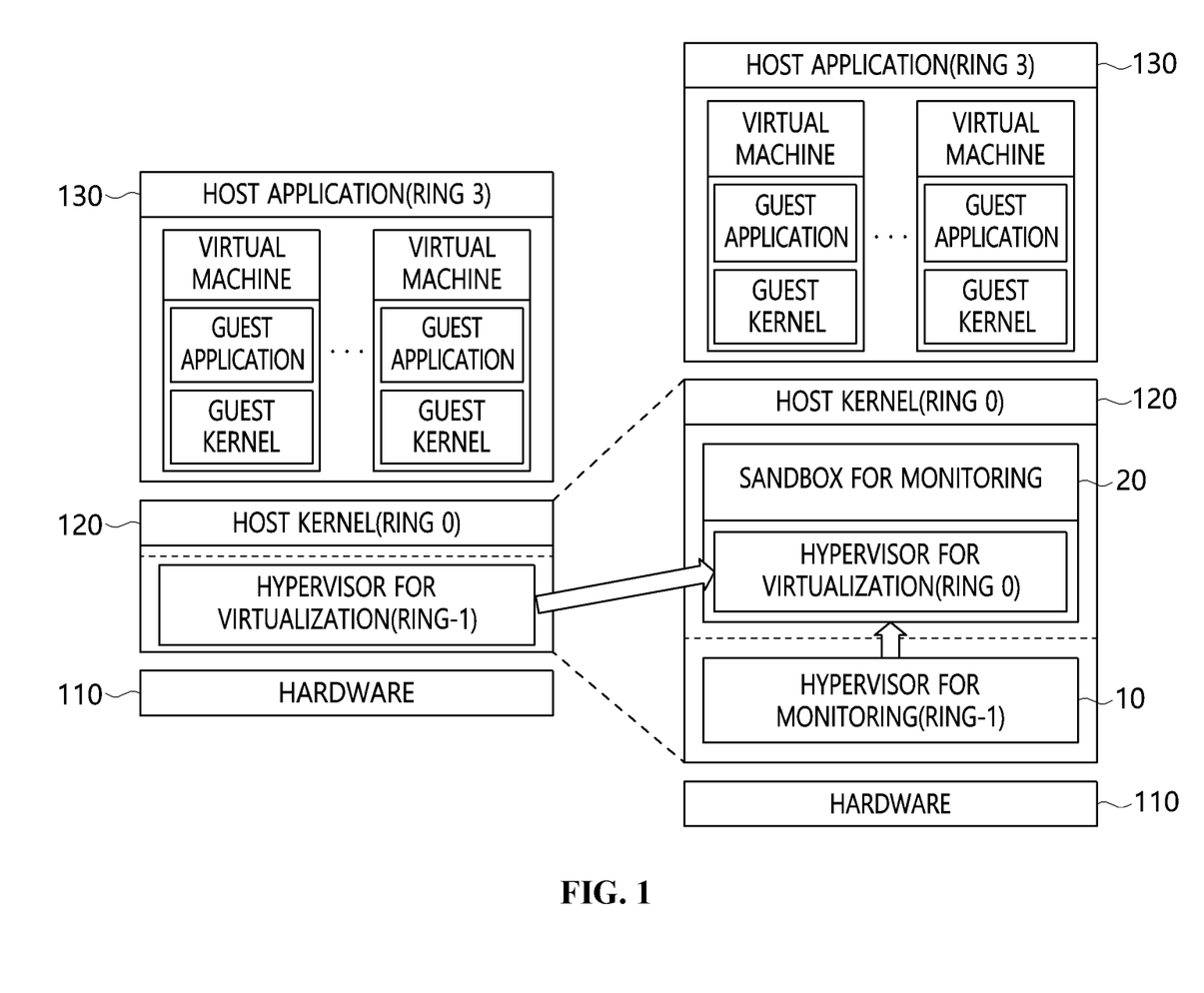
FIG. 1 is a view illustrating an apparatus for preventing a security threat to a virtual machine according to an embodiment of the present invention.

FIG. 1 is a view illustrating an apparatus for preventing a security threat to a virtual machine according to an embodiment of the present invention.

Referring to FIG. 1, the apparatus for preventing a security threat to a virtual machine according to an embodiment of the present invention includes hardware 110, a host kernel 120, and a host application 130.

The apparatus for preventing a security threat to a virtual machine may run a hypervisor for virtualization in the host kernel 120 on the hardware 110, and may run multiple virtual machines in the host application 130 on the hypervisor for virtualization.

The hypervisor for virtualization serves to isolate the virtual machines from each other and to allocate hardware resources thereto, and runs a privileged virtual machine to be used for the input/output from/to peripheral devices.

The virtual machine runs a special Operating System (OS), and may include a guest kernel, running on a guest machine, and a guest application, which is an application running on the guest machine.

The hypervisor for virtualization in the host kernel 20 may be run on a host OS, which is a physical machine OS running on the hardware 110.

Accordingly, the hypervisor for virtualization is configured as part of the host kernel. The hypervisor for virtualization runs the virtual machine in the form of a host application, but a guest kernel and a guest application may be run in the virtual machine.

Because a general hypervisor for virtualization has to perform functions related to virtualization, it may operate with a hypervisor privilege (Ring −1) having a level higher than that of a host kernel privilege (Ring 0).

Here, the apparatus for preventing a security threat to a virtual machine may lower the level of the privilege of the hypervisor for virtualization (Ring −1) to the level of the privilege of the host kernel (Ring 0) by locating the hypervisor for virtualization in a sandbox for monitoring 20 in order to detect and prevent an attack and a security threat, such as virtual machine escape.

Here, the apparatus for preventing a security threat to a virtual machine may create a hypervisor for monitoring 10, which monitors the hypervisor for virtualization, in an area separate from the area in which the hypervisor for virtualization is located in the host kernel 120, and may set the hypervisor for monitoring 10 to have the highest privilege level (Ring −1) in the host kernel 120.

Here, the hypervisor for monitoring 10 may control the sandbox for monitoring.

Here, the hypervisor for monitoring 10 is run in a separate memory area in the host kernel 120, and is inaccessible from the hypervisor for virtualization and from the area of the host kernel 120.

The hypervisor for virtualization located in the sandbox for monitoring 20 is not able to recognize the sandbox for monitoring 20 or the hypervisor for monitoring 10.

Accordingly, when an external attacker attempts to manage the virtual machine, all virtualization instructions related to management of the virtual machine may be interrupted due to a drop in the privilege level.

Here, after it verifies the interrupted virtualization instruction, the hypervisor for monitoring 10 may execute the same in place of the hypervisor for virtualization.

The sandbox for monitoring 20 may include the code area and data area of the host kernel, for which control is required, as well as the hypervisor for virtualization.

Also, it is possible for the sandbox for monitoring 20 to include the entire host kernel area therein according to need, in which case all host-kernel-related functions requested by the host application 130 may be controlled by the hypervisor for monitoring 10 and the sandbox for monitoring 20.

Figure 2:
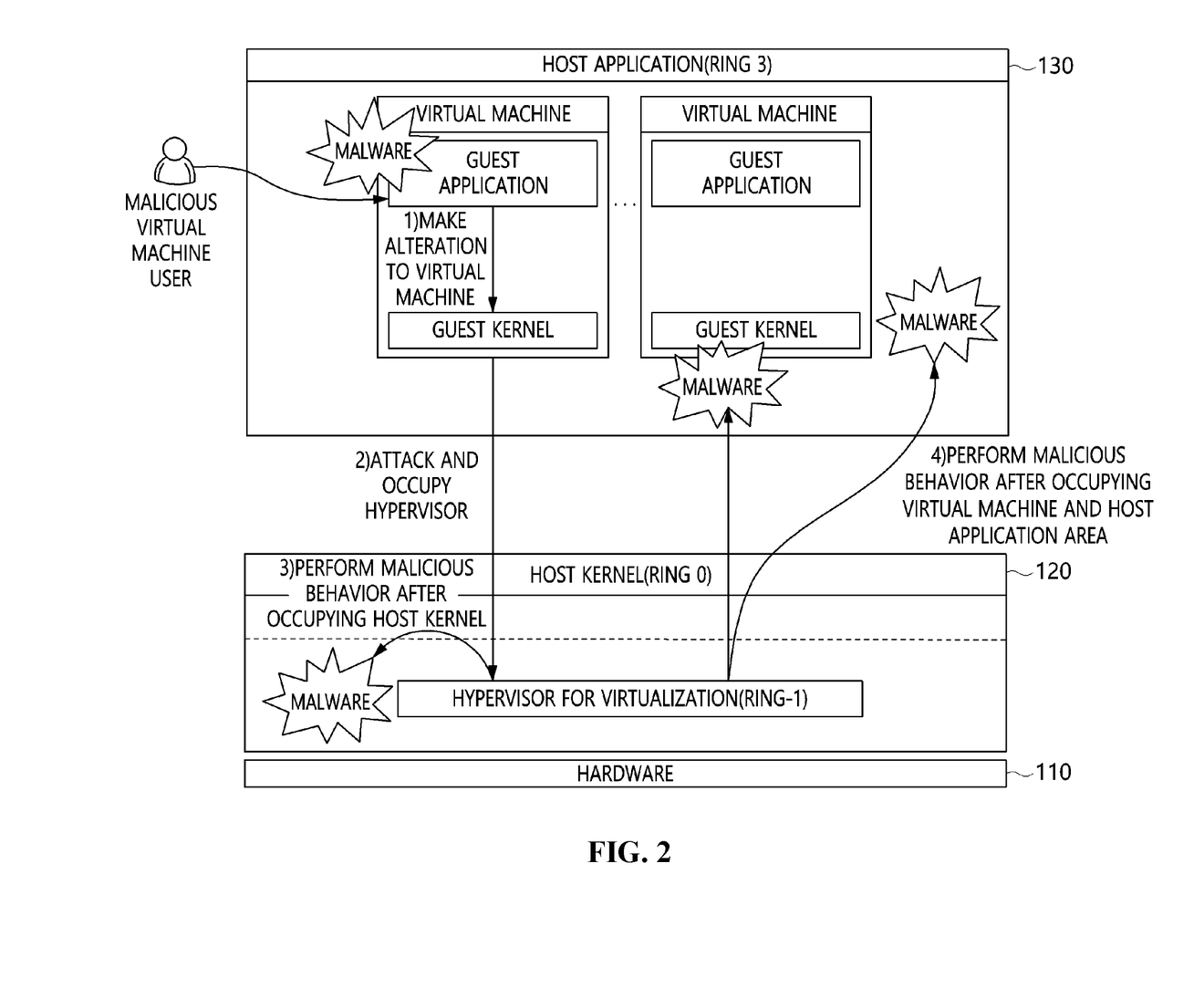
FIG. 2 is a view illustrating a security threat to a virtual machine according to an embodiment of the present invention.

FIG. 2 is a view illustrating a security threat to a virtual machine according to an embodiment of the present invention.

Referring to FIG. 2, it can be seen that a security threat in which a malicious user attempts virtual machine escape in a conventional virtualization system when a cloud service provider provisions multiple virtual machines to many unspecified users is illustrated.

Here, when a malicious user takes over a specific virtual machine or when a malicious user requisitions a virtual machine with malicious intent, the malicious user may attempt virtual machine escape in order to acquire important information in another virtual machine.

First, the malicious user may take over the virtual machine by tampering with the guest application and guest kernel of the virtual machine.

Subsequently, the malicious user may attack the hypervisor for virtualization by exploiting vulnerabilities therein, and may occupy the same.

Here, because the privilege level (RING −1) of the hypervisor for virtualization is set higher than the privilege level (RING 0) of the host kernel 120, the malicious user may also occupy the host kernel, and may perform malicious behavior by spreading malware.

Here, the malicious user may infect the virtual machine and host application area of another user with malware using the host kernel 120 and hypervisor for virtualization occupied thereby, and may leak important information or perform additional malicious behavior.

Figure 3:
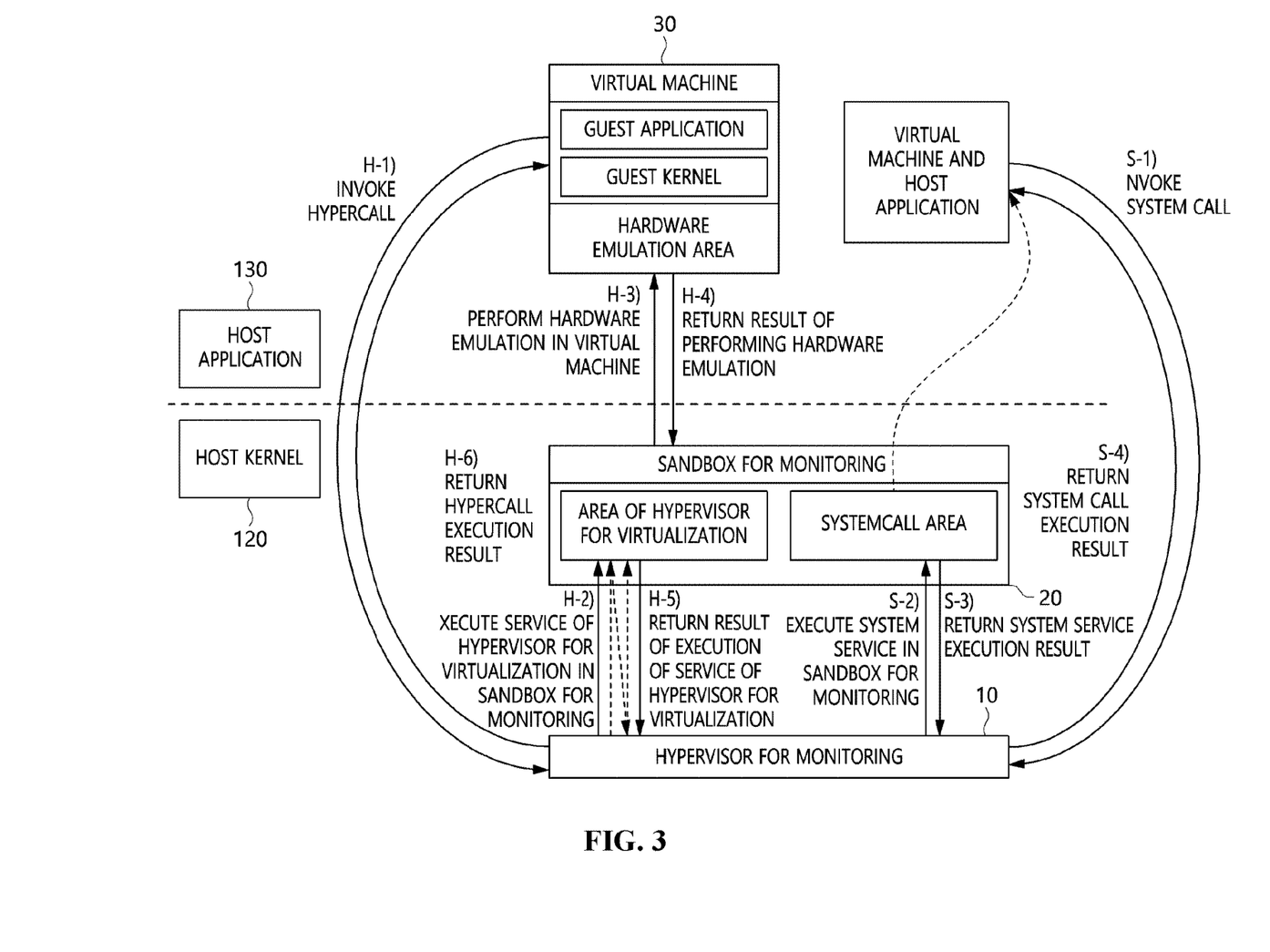
FIG. 3 is a block diagram illustrating a process for preventing a security threat to a virtual machine according to an embodiment of the present invention.

FIG. 3 is a block diagram illustrating a process for preventing a security threat to a virtual machine according to an embodiment of the present invention.

Referring to FIG. 3, the apparatus for preventing a security threat to a virtual machine according to an embodiment of the present invention may prevent a security threat, such as virtual machine escape by a malicious user, which is described with reference to FIG. 2.

In order to describe the process for preventing a security threat to a virtual machine, a procedure for processing a hypervisor service (H-1 to H-6) and a procedure for processing a system service (S-1 to S-4) will be described.

First, in the procedure of processing a hypervisor service, a virtual machine 30 created by a hypervisor for virtualization may request various hypervisor services when it is running (H-1).

Here, the virtual machine 30 may request a necessary hypervisor service in the form of a hypercall.

Upon receiving the hypercall, the hypervisor for monitoring 10 may enter a sandbox for monitoring 20 that is running, and may execute the service in the hypervisor for virtualization (H-2).

The hypervisor for virtualization executes virtualization instructions without recognizing the presence of the sandbox for monitoring or the hypervisor for monitoring, but all of the executed virtualization instructions are instead interrupted and executed by the hypervisor for monitoring 10.

When hardware emulation is required during execution of the hypervisor service, the hypervisor for virtualization may perform hardware emulation in the virtual machine (H-3) and receive the result thereof from the virtual machine 30 (H-4).

The hypervisor for virtualization may deliver the result of the hypervisor service, which is executed under the monitoring by the hypervisor for monitoring 10, to the hypervisor for monitoring 10 (H-5).

Here, the hypervisor for monitoring 10 may deliver the result of execution of the service to the virtual machine 30 again (H-6).

Here, the hypervisor for monitoring 10 may interrupt a virtualization instruction, corresponding to the task of delivering the result of execution of the service, and execute the same instead, thereby delivering the result of execution of the service to the virtual machine 30. As described above, because the task related to the hypervisor service is performed in the sandbox for monitoring under the control of the hypervisor for monitoring, it is possible to detect and prevent alterations to the main area of the host kernel or alterations to the hypervisor for virtualization, whereby virtual machine escape may be prevented.

Next, in the procedure of calling a system service, first, a virtual machine or a host application may request various system services from the host kernel 120 (S-1) when it is running.

Here, the virtual machine or the host application requests a necessary system service in the form of a system call, and the system call may be first received by the hypervisor for monitoring, like the hypercall described above.

The hypervisor for monitoring 10 may enter the sandbox for monitoring 20 that is running, and may access a system call service area (S-2).

In the system call service area, an interrupt point for detecting virtual machine escape is set, and access thereto triggers an event. When an event occurs, the hypervisor for monitoring may determine whether virtual machine escape is being attempted and control the virtual machine escape.

When execution of the system call service is completed, the hypervisor for monitoring 10 may receive the result of execution of the service from the system call service area (S-3).

The hypervisor for monitoring 10 may deliver the execution result to the virtual machine that requested the system service (S-4).

Here, when the hypervisor for monitoring 10 does not need to verify the result of execution of the system service, the result of execution of the service may be directly returned from the system call service area to the virtual machine 30.

As described above, a core task related to a system call service is performed in a manner in which the service requested by the virtual machine 30 is executed in the sandbox for monitoring 20 under the control of the hypervisor for monitoring 10, whereby virtual machine escape and unauthorized elevation of an OS privilege level may be detected and prevented.

Figure 4:
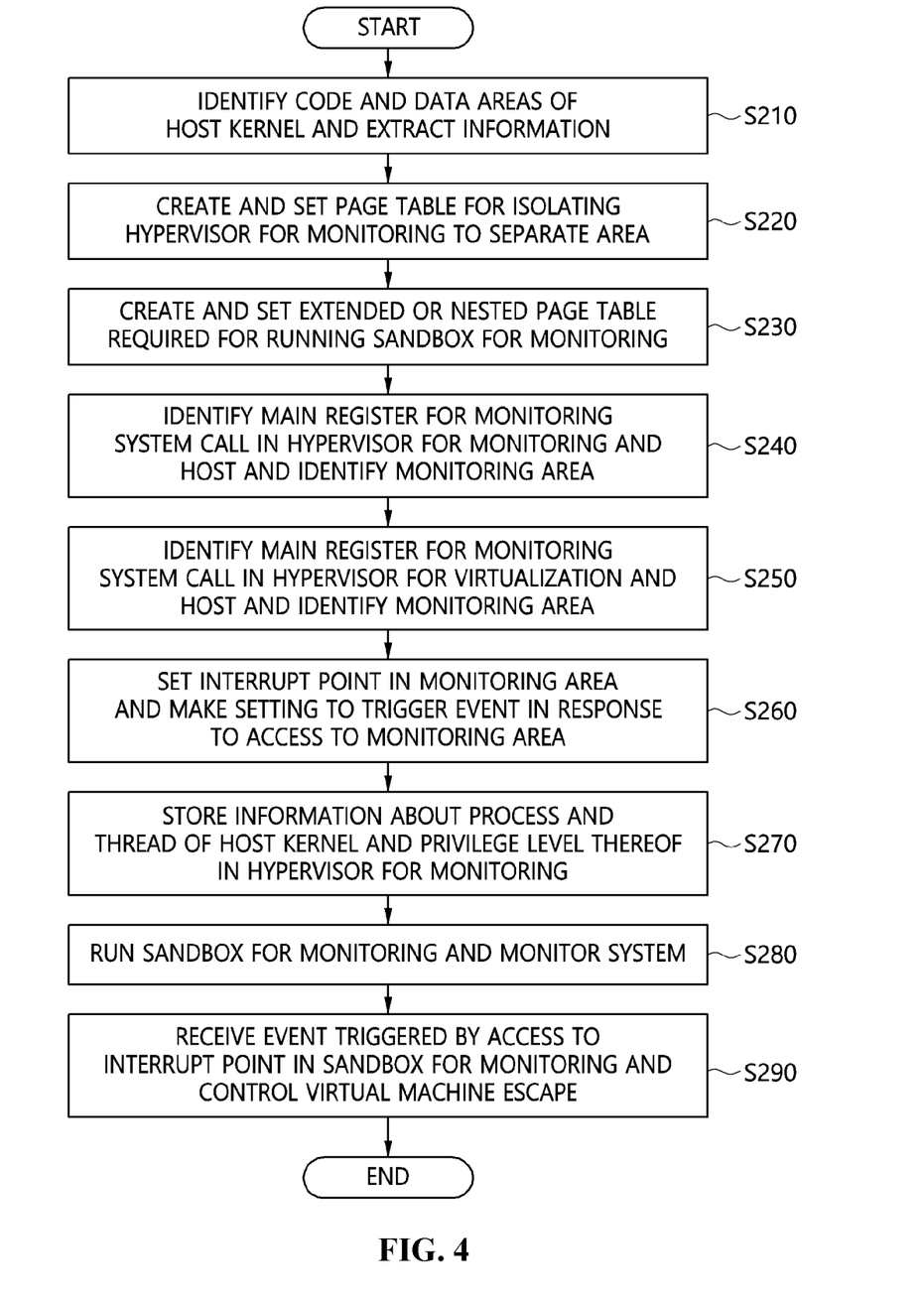
FIG. 4 is a flowchart illustrating a method for preventing a security threat to a virtual machine according to an embodiment of the present invention.

FIG. 4 is a flowchart illustrating a method for preventing a security threat to a virtual machine according to an embodiment of the present invention.

Referring to FIG. 4, first, a hypervisor for monitoring may identify the code and data areas of a host kernel and extract information at step S210.

Also, the hypervisor for monitoring may generate and configure a page table for isolating itself to a separate area using the identified kernel code and data areas at step S220.

Also, the hypervisor for monitoring may generate a sandbox for monitoring using the identified kernel code and data areas, and may generate and configure Extended Page Tables (EPT) or Nested Page Tables (NPT), which are memory virtualization functions of a CPU, at step S230.

Here, the hypervisor for monitoring may identify an invariable area in the identified code and data areas, and may make a setting to prevent a hypervisor for virtualization or the host kernel from arbitrarily tampering with the same.

Here, the area of the hypervisor for monitoring may be set such that the entire area thereof is not accessible by the hypervisor for virtualization or the host kernel.

Also, the hypervisor for monitoring may identify the main registers of the CPU and the monitoring area, which are required for running the sandbox for monitoring, at step S240, and may also identify the main register and monitoring area for monitoring a system call in the hypervisor for virtualization, which is to be run in the sandbox for monitoring, and in the host at step S250.

Also, the hypervisor for monitoring may set an interrupt point and make a setting to trigger an event at step S260.

Here, when it identifies all of the monitoring areas, the hypervisor for monitoring may set interrupt points in the corresponding areas by setting a page table privilege, by setting hardware or software breakpoints, and by setting monitoring of registers for CPU virtualization, and may make a setting to forcibly trigger an event when the interrupt point is accessed.

Here, the hypervisor for monitoring may handle the event occurring in the sandbox for monitoring.

Also, the hypervisor for monitoring may store information about the process and thread of the host kernel and information about the privileges thereof in the OS therein at step S270.

Also, the hypervisor for monitoring may monitor the overall system by running the sandbox for monitoring at step S280.

Here, the hypervisor for virtualization may execute a virtualization instruction corresponding to the service requested by the virtual machine of a host application.

Also, when an event occurs in the sandbox for monitoring due to access to the interrupt point, the hypervisor for monitoring may receive information about the event, determine whether virtual machine escape is attempted, and control the virtual machine escape at step S290.

Here, the hypervisor for monitoring may interrupt the virtualization instruction in response to the security threat event occurring in the monitoring area of the hypervisor for virtualization, and may control the process and thread of the host kernel.

Figure 5:
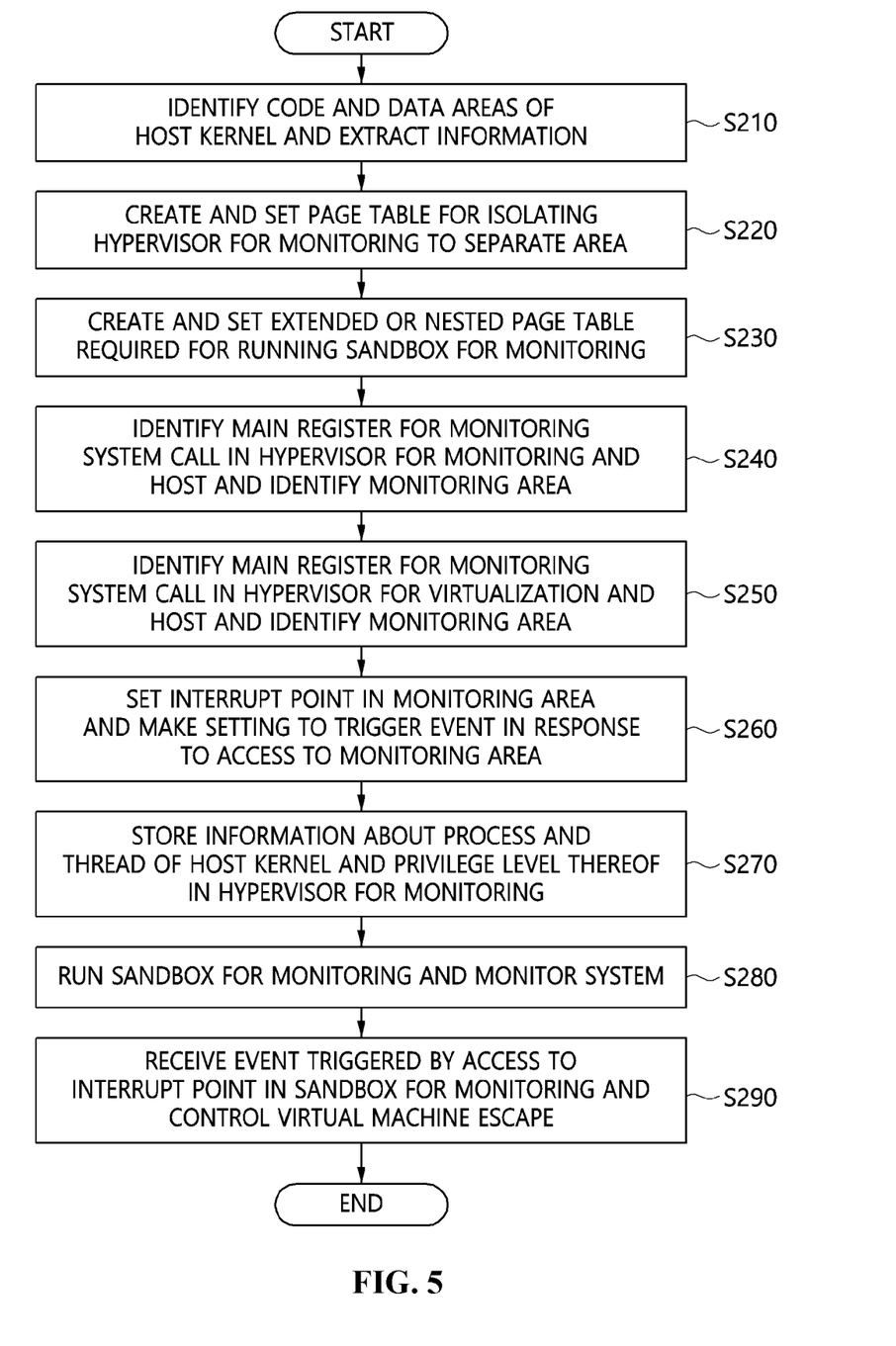
FIG. 5 is a flowchart illustrating the process the detecting an alteration event according to an embodiment of the present invention.

FIG. 5 is a flowchart illustrating a procedure for detecting an alteration event according to an embodiment of the present invention.

Referring to FIG. 5, an example in which a security threat event occurs at step S290, described in connection with FIG. 4, is illustrated in detail.

First, the hypervisor for monitoring may receive a request for a hypercall or a request for a system call from a virtual machine at step S310.

Upon receiving the request for the hypercall or the request for the system call, the hypervisor for monitoring may execute a hypervisor service or a system service in the sandbox for monitoring at step S320.

Here, the hypervisor for monitoring may check at step S330 whether the host kernel area or hypervisor area monitored thereby is altered or whether an alteration event occurs in the identified main registers.

Also, at step S330, when no alteration event occurs in the monitoring area and when the value of the memory or register to be changed does not cause virtual machine escape, the procedure may be terminated normally.

When an alteration event occurs, the hypervisor for monitoring may again determine at step S340 whether invariable memory or an invariable register is altered.

When an invariable area, such as the code of the host kernel, the code of the hypervisor for virtualization, or the like, is altered or when a specific flag bit of a control register is altered, the hypervisor for monitoring may regard the alteration as an attempt at virtual machine escape and control the corresponding process and thread at step S360.

When a variable area is altered, the hypervisor for monitoring determines at step S350 whether the value of the memory or register to be altered causes virtual machine escape, and may control the process and the thread at step S360 when it is determined that the alteration causes virtual machine escape.

That is, at step S360, when a security threat event that causes the memory area to be altered occurs in the monitoring area, the process and the thread may be controlled depending on the result of the determination as to whether or not the altered memory area is an invariable area.

Figure 6:
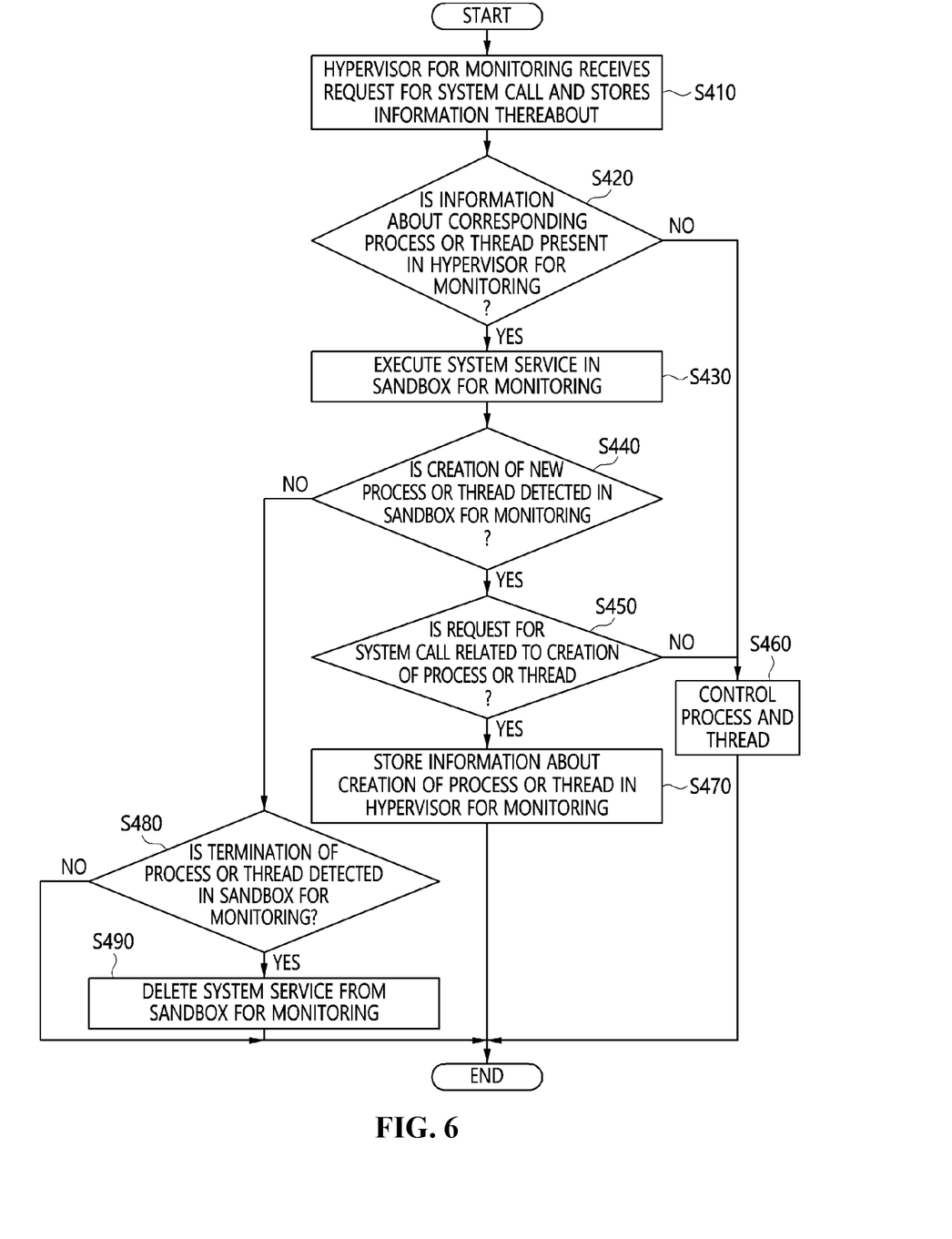
FIG. 6 is a flowchart illustrating the process of detecting unauthorized creation of a process and thread according to an embodiment of the present invention.

FIG. 6 is a flowchart illustrating the procedure of detecting unauthorized creation of a process and thread according to an embodiment of the present invention.

Referring to FIG. 6, an example in which a security threat event occurs at step S290, described in connection with FIG. 4, is illustrated in detail.

Upon receiving a request for a system call, the hypervisor for monitoring may store information about the system call therein at step S410.

Subsequently, the hypervisor for monitoring may check whether information about a corresponding process or thread is present therein, and may also determine at step S420 whether the information about the process or thread is generated normally.

Here, at step S420, when information about the process or thread is not present in the hypervisor for monitoring, it is determined that abnormal creation of the process or thread is caused due to virtual machine escape, and thus the corresponding process or thread may be controlled at step S460.

Here, when it is determined at step S420 that the information about the process or thread is generated normally in the hypervisor for monitoring, a system service may be executed in the sandbox for monitoring at step S430.

Also, the hypervisor for monitoring may check whether a new process or thread is detected using an interrupt point during execution of the service at step S440.

Here, when a new process or thread is detected during execution of the service at step S440, whether the request for the system call is related to the creation of the process or thread may be checked at step S450.

Here, when it is determined at step S450 that the system call is not related to the creation of the process or thread, it is determined that the creation is attempted through an abnormal route caused due to virtual machine escape. Accordingly, creation of the new process or thread is blocked, and the process or thread that requested the system call may be controlled at step S460.

That is, at step S460, when a security threat event that causes creation of a new process and thread occurs in the monitoring area, the process and thread that requested the system call may be controlled depending on the result of a determination as to whether the service requested by the virtual machine is related to the new process and thread.

Here, when it is determined at step S450 that the system call is related to the creation of the new process or thread, information about the creation of the process or thread may be stored in the hypervisor for monitoring at step S470.

Also, when creation of a new process or thread is not detected at step S440, whether termination of the process or thread is detected in the sandbox for monitoring may be checked at step S480.

Here, at step S480, when the termination is detected, information about the corresponding process or thread may be deleted from the hypervisor for monitoring such that the process and thread information in the host kernel matches the information in the hypervisor for monitoring.

As described above, information about a process and thread is stored in the hypervisor for monitoring when the process and thread are first run, and may be continuously updated whenever a system service is executed. When the process or thread is not terminated, the procedure of detecting unauthorized creation of a process or thread may be terminated normally.

Figure 7:
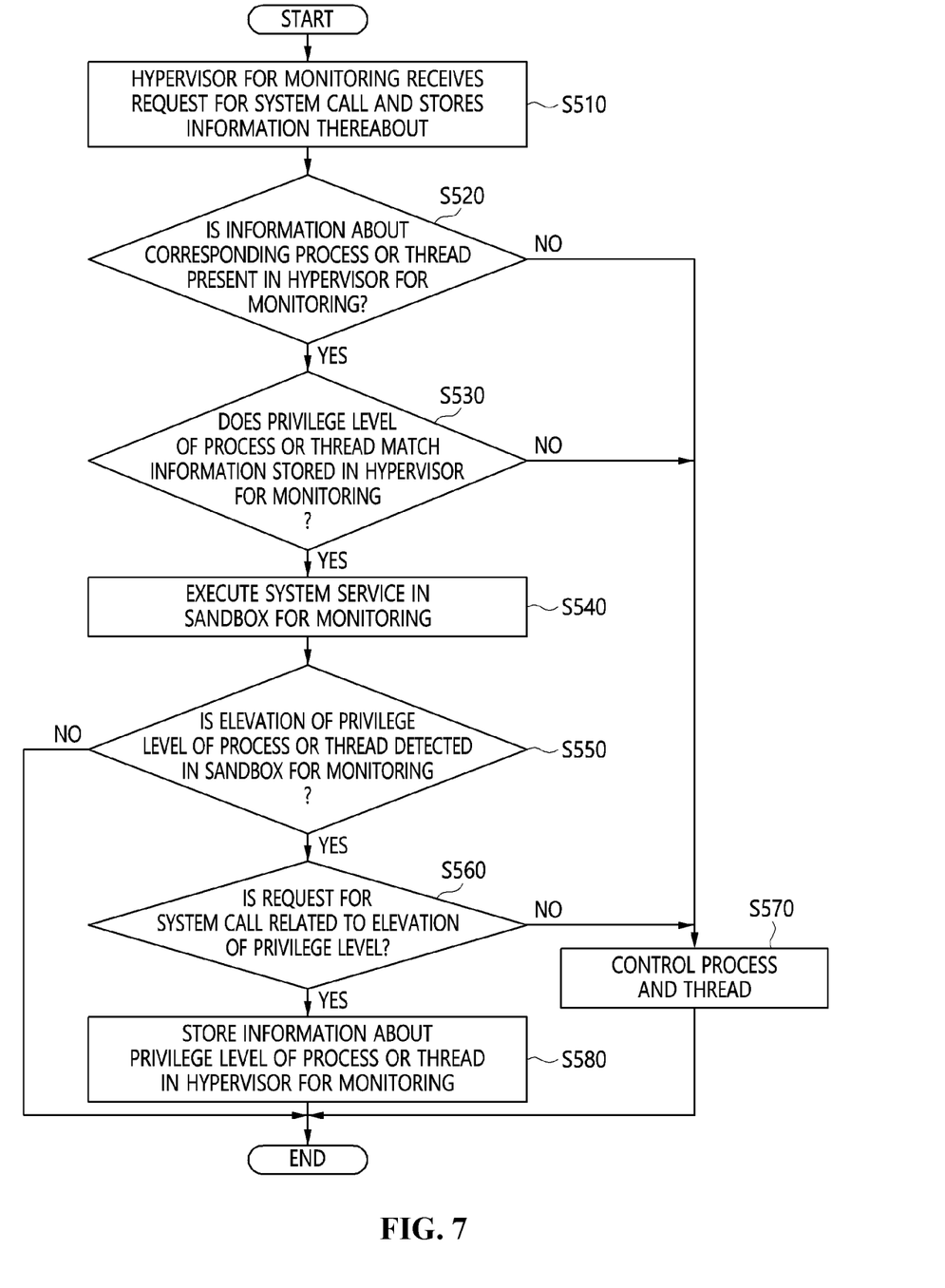
FIG. 7 is a flowchart illustrating the process of detecting unauthorized elevation of the privilege levels of a process and thread according to an embodiment of the present invention.

FIG. 7 is a flowchart illustrating the procedure of detecting unauthorized elevation of the privilege levels of a process and thread according to an embodiment of the present invention.

Referring to FIG. 7, an example in which a security threat event occurs at step S290, described in connection with FIG. 4, is illustrated in detail.

First, upon receiving a request for a system call from a virtual machine, the hypervisor for monitoring may store information about the system call therein at step S510.

The hypervisor for monitoring may check whether information about a corresponding process or thread is generated normally and is present therein at step S520.

Here, at step S520, when it is determined that the information about corresponding process or thread is generated normally and is present in the hypervisor for monitoring, whether the OS privilege level of the process or thread that requested the system call matches OS privilege information stored in the hypervisor for monitoring may be determined at step S530. Conversely, when information about the corresponding process or thread is not present in the hypervisor for monitoring, it is determined that abnormal creation of the process or thread is caused due to virtual machine escape, and thus the corresponding process or thread may be controlled at step S570, after which the procedure of detecting unauthorized elevation of the privilege levels of a process and thread may be terminated.

That is, at step S570, the corresponding process and thread may be controlled depending on whether information that is the same as information about the process and thread corresponding to the service requested by the virtual machine is present in the hypervisor for monitoring.

At step S530, when the privilege level of the process or thread matches the privilege information stored in the hypervisor for monitoring, the system service may be executed in the sandbox for monitoring at step S540, whereas when the privilege level of the process or thread does not match the privilege information stored in the hypervisor for monitoring, it is determined that unauthorized elevation of the privilege level is caused due to virtual machine escape, and the corresponding process and thread may be controlled at step S570.

That is, at step S570, when information that is the same as the information about the process and thread corresponding to the service requested by the virtual machine is present in the hypervisor for monitoring, the process and the thread may be controlled depending on whether the OS privileges of the process and thread are valid.

The hypervisor for monitoring may check whether elevation of the OS privilege level is detected using an interrupt point during execution of the service at step S550.

Here, when elevation of the OS privilege level is detected at step S550, whether the request for the system call is related to elevation of the OS privilege level may be checked at step S560, whereas when elevation of the OS privilege level is not detected, the procedure of detecting unauthorized elevation of the privilege levels of a process and thread may be terminated normally.

Here, when it is determined at step S560 that the request for the system call is related to elevation of the privilege level, information about the OS privilege level may be stored in the hypervisor for monitoring at step S580, whereas when it is determined that the request for the system call is not related to elevation of the OS privilege level, it is determined that unauthorized elevation of the privilege level is attempted through virtual machine escape, and thus the corresponding process and thread may be controlled at step S570.

That is, at step S570, when the OS privileges are not valid, it is determined that the OS privilege levels of the process and thread are elevated, and the process and thread may be controlled depending on whether elevation of the OS privilege levels is related to the service.

Figure 8:
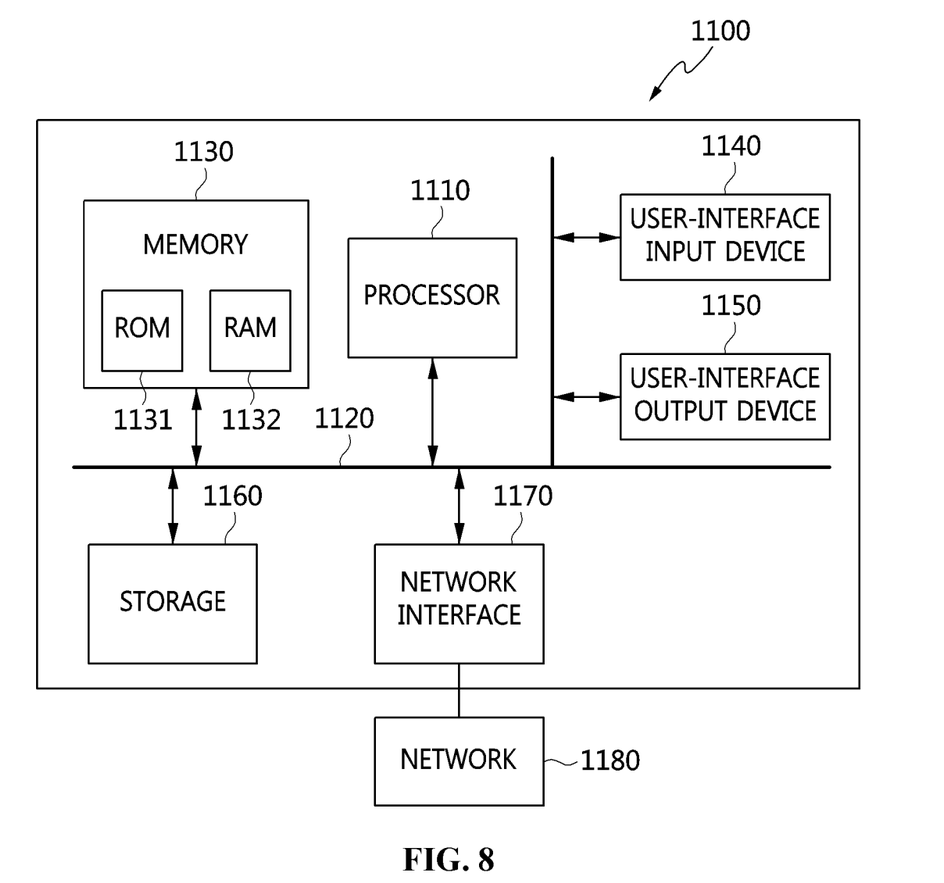
FIG. 8 is a view illustrating a computer system according to an embodiment of the present invention.

FIG. 8 is a view illustrating a computer system according to an embodiment of the present invention.

Referring to FIG. 8, the apparatus 100 for preventing a security threat to a virtual machine according to an embodiment of the present invention may be implemented in a computer system 1100 including a computer-readable recording medium. As illustrated in FIG. 8, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The apparatus for preventing a security threat to a virtual machine according to an embodiment of the present invention includes one or more processors 1110 and executable memory 1130 for storing at least one program executed by the one or more processors 1110. The at least one program is configured such that a hypervisor for monitoring in a host kernel executes a virtualization instruction corresponding to the service requested by the virtual machine of a host application and such that a hypervisor for monitoring interrupts the virtualization instruction in response to a security threat event occurring in the monitoring area of the hypervisor for virtualization and controls the process and thread of the host kernel. Here, the hypervisor for monitoring is located in an area separate from the area in which the hypervisor for virtualization is located in the host kernel.

Here, the hypervisor for monitoring is set to have the highest privilege level in the host kernel, and access thereto by the virtual machine and the hypervisor for virtualization may be prevented.

Here, the security threat event may occur in response to access to an interrupt point that is preset in the monitoring area.

Here, the interrupt point may be set in the monitoring area by at least one of setting a page table privilege, setting a breakpoint, and setting monitoring of a register for CPU virtualization.

Here, when a security threat event that causes a memory area to be altered occurs in the monitoring area, the at least one program may control the process and the thread depending on the result of the determination as to whether the altered memory area is an invariable area.

Here, when a security threat event that causes a new process and thread to be created occurs in the monitoring area, the at least one program may control the process and the thread depending on the result of a determination as to whether the service requested by the virtual machine is related to the new process and thread.

Here, depending on whether information that is the same as information about the process and thread corresponding to the service requested by the virtual machine is present in the hypervisor for monitoring, the at least one program may control the corresponding process and thread.

Here, when information that is the same as information about the process and thread corresponding to the service requested by the virtual machine is present in the hypervisor for monitoring, the at least one program may control the process and thread depending on whether the OS privileges of the process and thread are valid.

Here, when the OS privileges are not valid, the at least one program may determine that the OS privilege levels of the process and thread are elevated, and may control the process and thread depending on whether elevation of the OS privilege levels is related to the service.

The present invention may securely protect a system from a security threat posed to a virtual machine in a cloud-computing environment.

Also, the present invention may protect important information of a user of a virtual machine, and may enable secure management of system infrastructure.

As described above, the apparatus and method for preventing a security threat to a virtual machine according to the present invention are not limitedly applied to the configurations and operations of the above-described embodiments, but all or some of the embodiments may be selectively combined and configured, so that the embodiments may be modified in various ways.

What is claimed is:

1. An apparatus for preventing a security threat to a virtual machine, comprising:
one or more processors; and
executable memory comprising a program stored therein and executed by the one or more processors,
wherein the program is configured to:
cause a hypervisor for virtualization in a host kernel to execute a virtualization instruction corresponding to a service requested by a virtual machine of a host application, and
cause a hypervisor for monitoring to interrupt the virtualization instruction in response to a security threat event occurring in a monitoring area of the hypervisor for virtualization and to control a process and thread of the host kernel,
the hypervisor for monitoring being located in an area separate from an area in which the hypervisor for virtualization is located in the host kernel, wherein the security threat event is triggered by access to an interrupt point preset in the monitoring area of the hypervisor, wherein, when the security threat event that causes a memory area to be altered occurs in the monitoring area, the program controls the process and the thread depending on a result of a determination as to whether the altered memory area is an invariable area.

2. The apparatus of claim 1, wherein the hypervisor for monitoring is set to have a highest privilege level in the host kernel, and the virtual machine and the hypervisor for virtualization are prevented from accessing the hypervisor for monitoring.

3. The apparatus of claim 1, wherein the interrupt point is set in the monitoring area by at least one of setting a page table privilege, setting a breakpoint, and setting monitoring of a register for CPU virtualization.

4. The apparatus of claim 1, wherein, when the security threat event that causes a new process and thread to be created occurs in the monitoring area, the program controls the process and the thread depending on a result of a determination as to whether the service requested by the virtual machine is related to the new process and thread.

5. The apparatus of claim 1, wherein, depending on whether information that is a same as information about a process and thread corresponding to the service requested by the virtual machine is present in the hypervisor for monitoring, the program controls the corresponding process and thread.

6. The apparatus of claim 5, wherein, when the information that is the same as the information about the process and thread corresponding to the service requested by the virtual machine is present in the hypervisor for monitoring, the program controls the process and the thread depending on whether Operating System (OS) privileges of the process and thread are valid.

7. The apparatus of claim 6, wherein, when the OS privileges are not valid, the program determines that levels of the OS privileges of the process and thread are elevated, and controls the process and the thread depending on whether elevation of the levels of the OS privileges is related to the service.

8. A method for preventing a security threat to a virtual machine, performed by an apparatus for preventing a security threat to a virtual machine, comprising:

executing, by a hypervisor for virtualization in a host kernel, a virtualization instruction corresponding to a service requested by a virtual machine of a host application; and interrupting, by a hypervisor for monitoring, the virtualization instruction in response to a security threat event occurring in a monitoring area of the hypervisor for virtualization, and controlling, by the hypervisor for monitoring, a process and thread of the host kernel, wherein the hypervisor for monitoring is located in an area separate from an area in which the hypervisor for virtualization is located in the host kernel, wherein the security threat event is triggered by access to an interrupt point that is preset in the monitoring area of the hypervisor, wherein controlling the process and the thread is configured to control the process and the thread depending on a result of a determination as to whether a memory area is an invariable area when the security threat event that causes the memory area to be altered occurs in the monitoring area.

9. The method of claim 8, wherein the hypervisor for monitoring is set to have a highest privilege level in the host kernel, and the virtual machine and the hypervisor for virtualization are prevented from accessing the hypervisor for monitoring.

10. The method of claim 8, wherein the interrupt point is set in the monitoring area by at least one of setting a page table privilege, setting a breakpoint, and setting monitoring of a register for CPU virtualization.

11. The method of claim 8, wherein controlling the process and the thread is configured to control the process and thread depending on a result of a determination as to whether the service requested by the virtual machine is related to a new process and thread when the security threat event that causes the new process and thread to be created occurs in the monitoring area.

12. The method of claim 8, wherein controlling the process and the thread is configured such that, depending on whether information that is a same as information about a process and thread corresponding to the service requested by the virtual machine is present in the hypervisor for monitoring, the corresponding process and thread are controlled.

13. The method of claim 12, wherein controlling the process and the thread is configured to control the process and the thread depending on whether Operating System (OS) privileges of the process and thread are valid when the information that is the same as the information about the process and thread corresponding to the service requested by the virtual machine is present in the hypervisor for monitoring.

14. The method of claim 13, wherein controlling the process and the thread is configured to determine that levels of the OS privileges of the process and thread are elevated when the OS privileges are not valid, and to control the process and the thread depending on whether elevation of the levels of the OS privileges is related to the service.

* * * * *